July 22, 1952   J. H. HAYES   2,604,273
FISHING REEL
Filed May 1, 1946   2 SHEETS—SHEET 1
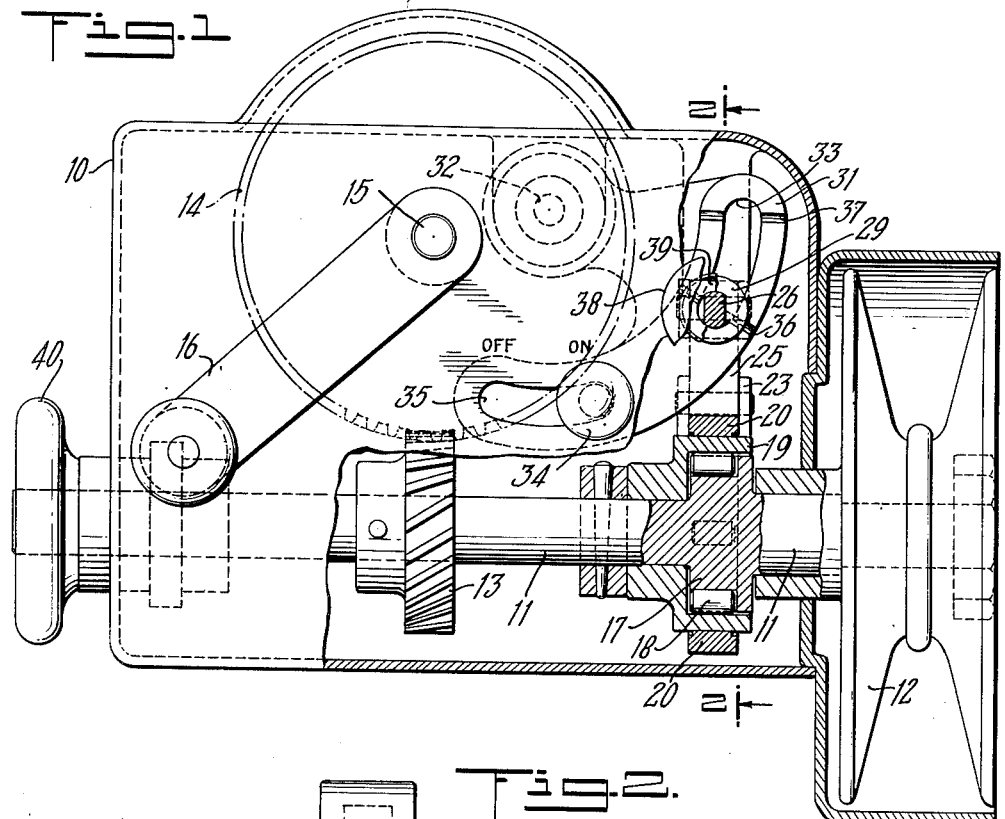
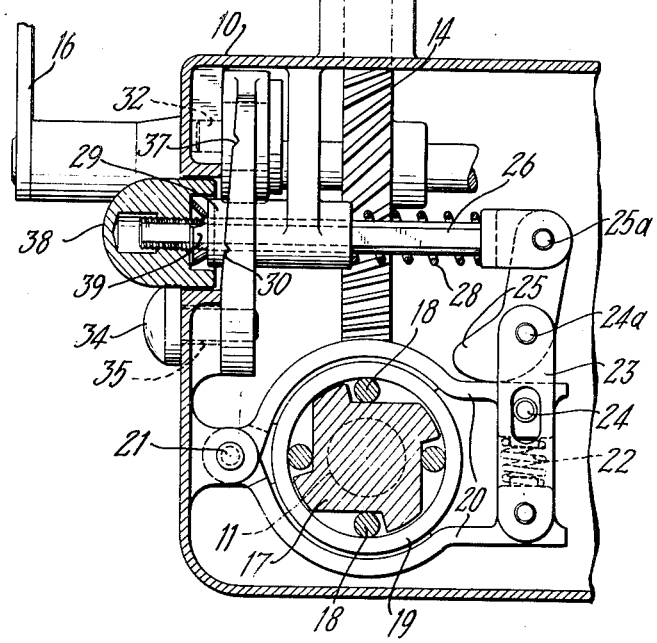
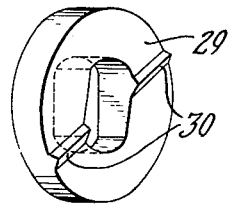
INVENTOR
JAMES H. HAYES
BY William Lang
ATTORNEY July 22, 1952 J. H. HAYES 2,604,273
FISHING REEL
Filed May 1, 1946 2 SHEETS—SHEET 2

INVENTOR
JAMES H. HAYES
BY
William Lang
ATTORNEY

Patented July 22, 1952

2,604,273

UNITED STATES PATENT OFFICE 2,604,273

FISHING REEL

James H. Hayes, New York, N. Y.

Application May 1, 1946, Serial No. 666,396

4 Claims. (Cl. 242—84.5)

This invention relates to fishing reels and more particularly to the brake mechanism thereof.

The principal object of the invention is to provide an improved brake mechanism which may be rapidly brought into action with a preadjusted tension. In operation, the brake mechanism is applied or brought into action and by adjustable devices the tension thereof is set with consideration for the tensile strength of the line employed, so that the spool will rotatably yield to a pull on the line below such value as would cause the line to break. After such tension has been established, the simple movement of an interposer will free the brake to enable casting or free spooling. To reapply the brake it is simply necessary to shift the interposer back, and in doing so the brake will become applied with the previously set tension. By this means each brake application is effected in a simple, rapid manner and uniformity of tension is obtained within safe limits and danger of overtensioning the line is obviated.

As a modified form of the invention there is provided a drag applying mechanism which automatically comes into action when the spool shaft is rotated in dragging direction.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is an elevation of a reel housing and spool, showing the manner in which the brake mechanism is applied thereto.

Fig. 2 is a section taken substantially along lines 2—2 of Fig. 1.

Fig. 2a is a detail of a camming collar.

Figure 3:
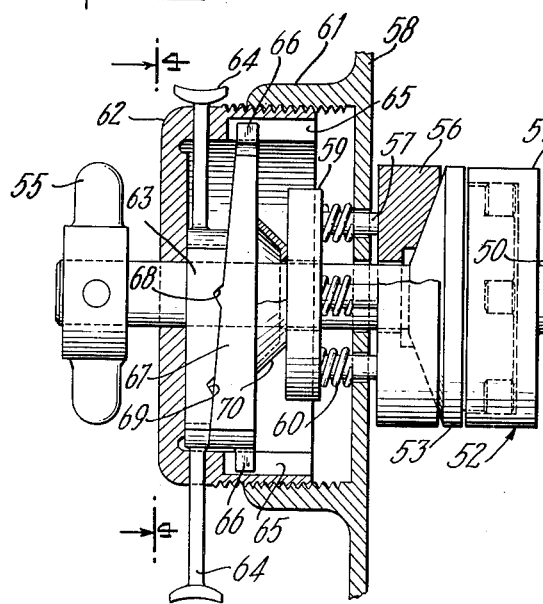
Fig. 3 is a view showing a modified form of brake employing the same principles as that of Figs. 1 and 2.
Figure 4:
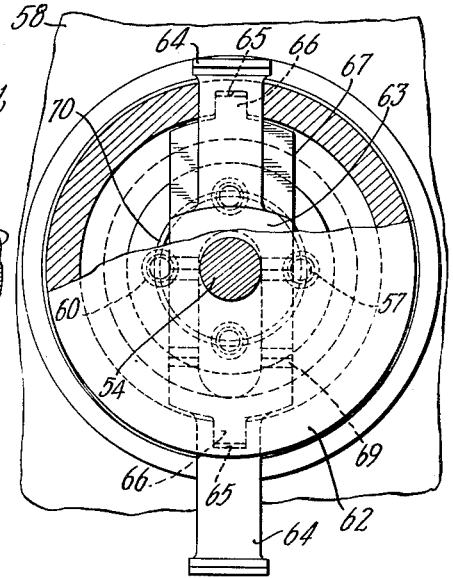
Fig. 4 is a section taken on line 4—4 of Fig. 3 with part of the housing broken away.

Referring to Fig. 1, there is shown a type of reel comprising a housing 10 in which there is supported a spool shaft 11 provided with a spool 12 affixed to one end thereof. The shaft and spool are driven through gears 13 and 14, the latter of which is supported on a rod 15 to which handle 16 is secured. This reel is of the so-called spinner type disclosed in my copending application Serial No. 583,729 filed March 20, 1945.

In accordance with the present invention the spool shaft 11 has integral therewith a clutch element 17 notched as shown in Fig. 2 to receive rollers 18. Surrounding the element 17 and balls 18 is a drum 19 which is freely rotatable on shaft 11 and at opposite sides of the shell are brake shoes 20, pivoted on a fixed pin 21 and normally urged apart and out of contacting engagement with drum 19 by a spring 22.

The lower shoe 20 has a link 23 pivoted thereto and a pin 24 in the upper shoe passes through an opening in the link whose upper end is pivoted at 24a to a cam 25 which in turn is pivoted at its upper end at 25a to a rod 26 mounted for reciprocation in a fixed bearing 27 and constrained against rotation. A spring 28 serves to normally rock cam 25 clockwise into its brake releasing position.

A sleeve or collar 29 (Fig. 2a) is slidable on rod 26 but constrained against rotation thereon and this sleeve is provided with a pair of radial detaining wedges 30. At the right of sleeve 29 is a tapered member 31 pivoted on a stud 32 (Fig. 1) so that it may be rocked clockwise from the position shown in Fig. 1 through an angle determined by slot 33 which straddles rod 26.

A knob 34, secured to member 31 extends through an opening 35 in the housing 10 and through this knob the member 31 may be rocked between its extreme positions. The member has a pair of notches 36 and 37, one of which registers with wedges 30 of sleeve 29 when the member 31 is in its position of Fig. 1 and the other, when the member is in its alternate position.

The left end of rod 26 (Fig. 2) has threaded thereon a tension adjusting knob 38 whose inner end bears against a cupped spring washer 39 which abuts sleeve 29. By adjusting this knob the pressure between the sleeve 29 and member 31 may be varied in accordance with the desired conditions.

When knob 34 is in its alternate position, member 31 will be in position with its narrower end (Fig. 2) and notch 37 opposite sleeve 29 so that spring 28 may urge rod 26 to the right to release the brake. This position of the parts may be termed the off or non-braking position wherein the shaft 11 and spool 12 are freely rotatable in a clockwise direction (as viewed in Fig. 2) for reeling-in action or free spooling. A thumb drag 40 (Fig. 1) is secured to shaft 11 to enable control of the free spooling action.

When a strike is made, knob 34 is rocked back to the position of Fig. 1 and carries with it the member 31, so that the latter now cams sleeve 29 toward the left (as viewed in Fig. 2). Sleeve 29 in turn, bears against spring 40 and therethrough moves knob 38 and rod 26 to the left to rock cam 25 and urge the brake shoes 20 toward drum 19, to effect a braking action. That is, as tension on the line tends to turn shaft 11 counterclockwise, element 17 will turn therewith and through rollers 18 lock with drum 19. The drum, being engaged by the brake shoes will slip in accordance with the initially set tension applied by knob 38 to spring 39.

Thus, when a strike is made the fisherman may immediately throw the brake into action with a predetermined and preset tension without danger of overstraining the line by a too hasty overtensioning.

In the modification of Fig. 3, shaft 50 represents the spool shaft to which drum 51 of an overrunning clutch 52 is secured and through which a conical braking element 53 is driven when there is a drag on the line. This element has integral therewith, a rod 54 provided with a thumb drag 55. Facing element 53 is a complemental braking element 56 free on rod 54 and supported by four posts 57 in housing 58. These posts are also secured in a plate 59 and through springs 60 the plate and brake element 56 are biased toward the left as viewed in Fig. 3, out of braking position.

Housing 58 has a circular, internally threaded boss 61 into which is threaded a head 62. A yoke 63 straddles rod 54 and has extending finger pieces 64 through which the yoke may be shifted transversely to the axis of rod 54. The head 62 is provided with a pair of channels 65 into which lugs 66 of a second yoke 67 fit. This yoke has a detenting wedge 68 facing yoke 63 and adapted to cooperate with notches 69 therein. Between yoke 67 and plate 59 is a cupped spring 70 urging the yoke and plate apart.

The action is such that when yoke 63 is in its lower position as shown in Fig. 3, its camming surface slides yoke 67 to the right, comprising spring washer 70 against plate 59 to urge clutch element 56 into braking engagement with element 53 to place a drag on spool shaft 50 through the overrunning clutch 52. The force of the braking action will depend on the setting of head 62, which by threading into and out of boss 61 will preset the tension applied through spring 70 by decreasing or increasing the distance between the yoke 67 and plate 59.

When yoke 63 is shifted to its upper position, yoke 67 is free to shift to the left under action of springs 70 and 60 to release the brake and when a strike is made the brake may be quickly applied by simply shifting yoke 63.

Figure 5:
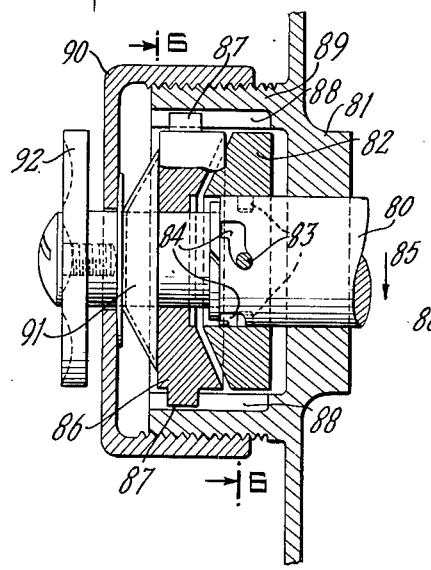
Fig. 5 is a further modification in which the preadjusted tension is applied in a somewhat different manner.
Figure 6:
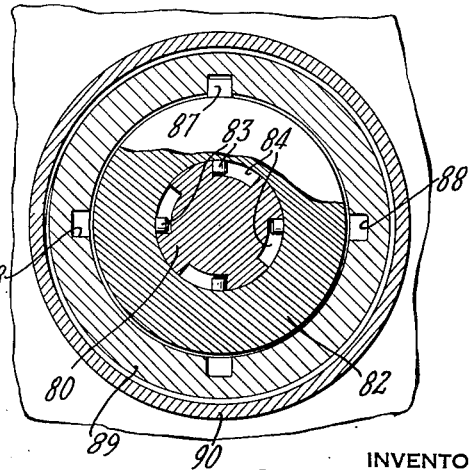
Fig. 6 is a section taken substantially on lines 6—6 of Fig. 5.

A further modification is shown in Figs. 5 and 6 wherein 80 constitutes a spool shaft supported in housing 81 and having a braking element 82 at one end thereof supported by four circumferentially spaced pins 83 extending into cam slots 84 in the shaft. The action is such that when shaft 80 is turned relatively to element 82, in the direction of arrow 85, slots 84 will shift pins 83 and element 82 to the left against braking element 86 to effect braking of the shaft. When it is turned in the opposite direction, for reeling, the slots cam the pins and element 82 out of braking engagement.

The braking element 86 is free on a reduced part of shaft 80 and has lugs 87 riding in channels 88 of housing 89. Threaded on the housing is a head 90 which may be adjusted axially to tension a cupped spring 91 between the head 90 and braking element 86. The action in this modification is automatic in that when there is a drag on the line, turning shaft 80 in the direction of arrow 85, element 82 shifts to the left and engages element 86 with a force predetermined by the initial adjustment of head 90. The extremity of shaft 80 may be provided with the usual thumb drag 92.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a fishing reel, a housing adapted to be secured to a rod, a shaft rotatably mounted in said housing, means located within the housing for rotating said shaft, a spool on one end of said shaft beyond said housing, a thumb drag on the opposite end of said shaft, a drum mounted on said shaft for free rotation in respect thereof, means for automatically securing said drum to and releasing said drum from said shaft, a brake shoe mounted on said housing and overlying said drum, a rod mounted in said housing for axial movement, a cam connection between one end of said rod and said brake shoe to move said brake shoe into frictional engagement with said drum, resilient means on said rod for normally rendering said cam connection inoperative, a sleeve mounted on and movable longitudinally of said rod and having a pair of spaced projections thereon, an adjusting knob having screw-threaded engagement with the end of said rod opposite to that on which said cam connection is mounted, a brake control member mounted within and on said housing and having a receding face in which is located a pair of spaced notches adapted to be alternately engaged by said projections on said sleeve, resilient means interposed between said sleeve and said knob for forcing said sleeve into engagement with said receding face with different degrees of pressure whereby the brake shoe may be applied to said drum with predetermined and variable pressures upon movements of said brake control member.

2. In a fishing reel, a housing adapted to be secured to a rod, a shaft rotatably mounted in said housing, means located within the housing for rotating said shaft, a spool on one end of said shaft beyond said housing, a drum mounted on said shaft for free rotation in respect thereof, means for automatically securing said drum to and releasing said drum from said shaft, a brake shoe mounted on said housing and overlying said drum, a rod mounted in said housing for axial movement, a connection between one end of said rod and said brake shoe to move said brake shoe into frictional engagement with said drum, a sleeve mounted on and movable longitudinally of said rod and having a pair of spaced projections thereon, an adjusting knob having screw-threaded engagement with the end of said rod opposite to that on which said connection is mounted, a brake control member mounted within and on said housing and having a receding face in which is located a pair of spaced notches adapted to be alternately engaged by said projections on said sleeve, resilient means interposed between said sleeve and said knob for forcing said sleeve into engagement with said receding face with different degrees of pressure whereby the brake shoe may be applied to said drum with predetermined and variable pressures upon movements of said brake control member.

3. In a fishing reel, a housing, a shaft rotatably mounted in said housing and projecting from one end thereof, a spool coaxially mounted on the extended end of said shaft, means for securing said housing to a rod with the axes of said spool and said rod substantially parallel, means for rotating said shaft and said spool in one direction, and means for braking the rotation of said spool in the opposite direction which includes a braking surface on said shaft, a brake shoe adapted to engage said surface, a longitudinally movable rod mounted in said housing, a connection between said rod and shoe to move the latter into engagement with said braking surface upon movement of said rod in one direction, a sleeve longitudinally movable on said rod, a wedge shaped operating member movably mounted in said housing and adapted to be moved to various positions in respect of said sleeve, and a spring urging said sleeve into engagement with said wedge shaped member.

4. The combination of elements recited in claim 3 in which means for varying the effectiveness of said spring is provided.

JAMES H. HAYES.

REFERENCES CITED

The following references are of record in the file of this patent:

UNITED STATES PATENTS

| Number | Name | Date |
|---|---|---|
| 320,419 | Walters | June 16, 1885 |
| 1,836,869 | Pflueger et al. | Dec. 15, 1931 |
| 1,995,221 | Peel et al. | Mar. 19, 1935 |

FOREIGN PATENTS

| Number | Country | Date |
|---|---|---|
| 21,131 | Great Britain | of 1913 |
| 635,951 | France | Jan. 3, 1928 |